F. FORSHEE.
GREASE CUP.
APPLICATION FILED APR. 22, 1918.

1,292,594.

Patented Jan. 28, 1919.

INVENTOR
Frank Forshee
BY
ATTORNEY

UNITED STATES PATENT OFFICE.

FRANK FORSHEE, OF FLINT, MICHIGAN, ASSIGNOR, BY MESNE ASSIGNMENTS, TO COPEMAN DEVELOPMENT COMPANY, OF FLINT, MICHIGAN, A CORPORATION OF MICHIGAN.

GREASE-CUP.

1,292,594.   Specification of Letters Patent.   Patented Jan. 28, 1919.

Application filed April 22, 1918. Serial No. 229,905.

*To all whom it may concern:*

Be it known that I, FRANK FORSHEE, a citizen of the United States, residing at Flint, in the county of Genesee and State of Michigan, have invented a new and useful Improvement in Grease-Cups, of which the following is a specification.

This invention relates to grease cups and has for its object a grease cup which is better adapted to the use of a grease capsule than those heretofore existing.

Grease capsules for use in connection with grease cups are fast coming into favor but the capsules are usually made of some paper stock and consequently do not always have a circular cross section but assume more nearly an oval cross section and very often in packing and handling the grease capsules some of them become jammed. In a grease cup the cross section, of course, is always circular. Consequently grease capsules which are nicely calculated to fit such a grease cup very often are hard to introduce by reason of tending to assume this oval shape or because their edges have become jammed in packing.

It is to obviate these troubles and at the same time have a grease capsule which very nicely fits the cup, so as to prevent the grease from going behind the capsule instead of being forced out the orifice, that this invention is designed.

In the drawings,—

Figures 1 to 5 inclusive show the receptacle part of the grease cup in the five stages of formation.

Figure 1:
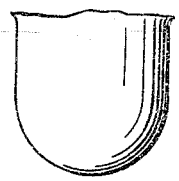
Figure 4:
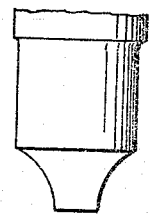
Figure 7:
Figs. 7, 8 and 9 show the several stages in the formation of the cap.
Figure 8:
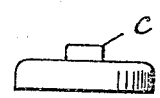
Figure 2:
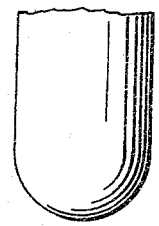
Figure 5:
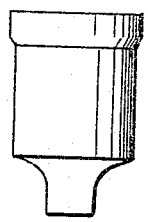
Figure 9:
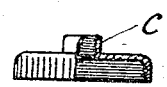
Figure 3:
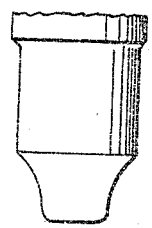
Figure 6:
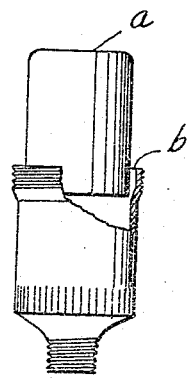
Fig. 6 shows the completed receptacle portion and shows a grease capsule being introduced thereinto.
Figure 10:
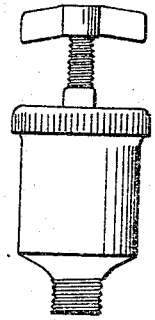
Fig. 10 shows the completed and assembled cup.

The final barrel is shown in Fig. 6. The exterior of the bell mouth portion has been threaded to receive the threads of the cap, while the exterior of the neck has been threaded to screw the barrel into the member which is to be lubricated. Along the side of the barrel near the lower end the barrel is knurled to facilitate screwing in and out of its seat.

In Fig. 6 the grease capsule is shown and designated *a*. It will be noted that this grease capsule is of a diameter to just nicely pack into the intermediate portion of the barrel so that when the plunger is screwed down the grease will not creep up between the sides of the capsule and the barrel and get onto the plunger and possibly by the plunger. With the bell mouth portion *b* it will be seen that there is quite a clearance between the capsule and the barrel when the capsule is being introduced into the barrel, and consequently if the capsule is distorted in any way this bell mouth will allow the capsule to be introduced without the trouble that would ordinarily be necessary to get it in. In fact, even if the capsule is perfectly circular in cross section, this bell mouth facilitates the introduction of the capsule into the barrel for it is recognized to be a difficulty to manually bring two members into exact registry.

What I claim is:

1. A grease cup, comprising a barrel and a cap, said barrel arranged to take a grease capsule of given diameter and having a flaring mouth, and the said grease capsule of a diameter to pass the flaring mouth with substantial clearance and to nicely fit the main portion of the barrel.

2. In a grease cup, a collapsible grease capsule, a barrel provided with a mouth having an enlarged diameter to allow the capsule to enter with ample clearance, and a main body portion having a diameter calculated to just fit the grease capsule.

3. In a grease cup. a grease capsule, a barrel provided with a cylindrical intermediate body portion having a diameter just calculated to fit the grease capsule and having a pressed out bell shaped mouth of enlarged diameter gradually merging into the body portion and exteriorly screw-threaded, and provided with a neck portion adjoining the body portion, and a cap for screwing onto the exterior of the bell shaped mouth.

In witness whereof I have hereunto set my hand on the 10th day of April 1918.

FRANK FORSHEE.

Copies of this patent may be obtained for five cents each, by addressing the "Commissioner of Patents, Washington, D. C."